United States Patent [19]

Rhee et al.

[11] Patent Number: 5,639,398
[45] Date of Patent: Jun. 17, 1997

[54] CONDUCTIVE LIQUID CRYSTAL ALIGNMENT LAYERS AND PROCESS FOR THE PREPARATION THEREOF

[75] Inventors: Suh Bong Rhee; Myong-Hoon Lee; Eunkyoung Kim, all of Taejeon, Rep. of Korea

[73] Assignee: Korea Research Institute of Chemical Technology, Taejeon, Rep. of Korea

[21] Appl. No.: 380,516

[22] Filed: Jan. 30, 1995

[30] Foreign Application Priority Data

Jul. 6, 1994 [KR] Rep. of Korea .............. 94-16194

[51] Int. Cl.⁶ .................. C09K 19/52; C09K 19/58; C09K 19/56
[52] U.S. Cl. .................. 252/299.01; 252/299.2; 252/299.4
[58] Field of Search .............. 252/299.01, 299.4, 252/299.2

[56] References Cited

U.S. PATENT DOCUMENTS 3,920,576 11/1975 Jones, Jr. et al. .............. 252/299.2
3,963,638  6/1976 Bucher et al. .................. 252/299.2

*Primary Examiner*—C. H. Kelly
*Attorney, Agent, or Firm*—Birch, Stewart, Kolasch & Birch, LLP

[57] ABSTRACT

Conductive liquid crystal polymer composites and a process for the preparation thereof are disclosed, as well as the preparation of liquid crystal alignment layers for liquid crystal displays and a process for the preparation thereof. Also, the disclosure relates to the preparation of conductive liquid crystalline polymer composites with an excellent processability and stability, and a process for the preparation of conductive alignment layers that reduce the static charge during the fabrication of the displays.

14 Claims, 4 Drawing Sheets

CONDUCTIVE LIQUID CRYSTAL ALIGNMENT LAYERS AND PROCESS FOR THE PREPARATION THEREOF

BACKGROUND OF THE INVENTION

1. Field of the Invention

The present invention relates to conductive liquid crystalline polymer composites and to a process for the preparation thereof, and also the preparation of conductive liquid crystal alignment layers for liquid crystal displays and to a process for the preparation thereof. More particularly, the present invention relates to the preparation of conductive liquid crystalline polymer composites with excellent processibility and thermal stability and to a process for the preparation of conductive liquid crystal alignment layers that reduce static charges and dust contamination at the time of manufacturing liquid crystal display devices.

2. Description of the Prior Art

Flat-panel displays using liquid crystals have been widely employed by a variety of electronic devices such as calculators, computers, and televisions. These liquid crystal display (LCD) has also received a great deal of investigation and attention due to their potential applications to high technological products requiring man-machine interface. Liquid crystals in the display elements of these device are usually oriented by means of an alignment layer obtained by various techniques. Alignment is generally obtained by means a rubbing, stretching, or shearing technique, or by LB deposition (Chem. Lett. 1991, 1351).

However, those alignment techniques are in some cases not useful for industrial applications. Furthermore, they involve high expenses or do not maintain bistability. In particular, the rubbing technique, in which an insulating polymer film is rubbed with cloth, generate static charges, which can trap dust particles between the cell surfaces, and this has several serious problems related thereto. For example, poor alignment, severe wedging of the cell, and electrical breakdown across the dust particle reduces the life time of the cell and disrupts the optical guided mode structure.

Therefore, it is necessary to develop a conductive alignment layer in order to avoid the production of static charges during the fabrication of liquid crystal displays. For example, one method was introduced in Japanese laid open Patent No. 3-234919 that orients the liquid crystals by rubbing an electrically conducting polyaniline film prepared on an ITO glass via electrochemical polymerization.

According to the patent there are several advantages in the use of the conductive polymer membrane: (a) it removes static charges which has been a problem in the case of insulating polymer alignment layers, and (b) it reduces applying voltage of the display cell due to the conductivity of the polymer.

Despite of these advantages, there are also some disadvantages to the use of this polyaniline alignment layer. First of all, this well-known polyaniline film may corrode the transparent conducting glass (ITO glass) by the use of a strong acid electrolyte during the electrochemical polymerization. Secondly, since the adhesion between the conducting polymer and glass is low, there is a possibility that the conducting polymer film can be detached from the glass electrode. Third, when the liquid crystal device operates, the residual electrolyte ions or dopants in the polyaniline film can erupt into the liquid crystal, causing the shortening of the lifetime of the liquid crystal device.

Furthermore, due to the brittleness and the poor mechanical property of the polyaniline film, the polymer film can be detached from the ITO glass when the polymer surface is rubbed by a nylon comb to induce alignment of the liquid crystals.

Especially, it is not possible to synthesize an alignment layer with a large area by the electrochemical polymerization method. Thus, when an alignment layer is prepared by this method, there is a limitation in the size of the liquid crystal display device. In order to solve these problems, it is essential to use a conducting polymer with an excellent processability, which is accessible to the spin coating or dip coating technique. It is also desirable for the conducting polymer to have a liquid crystalline property to induce uniform alignment of liquid crystals on the surface of the alignment layer.

In particular, processing from an orientationally ordered polymer phase is capable of imparting a high degree of chain alignment and greatly enhanced mechanical, electrical, and optical properties.

Therefore, the inventors of the present application have developed a conducting polymer composite with excellent processability and synthesis technique, and which is effective in the preparation method of conductive alignment layers for LCDs.

Since liquid crystalline phase behavior is observed in the fluid state, liquid crystalline polymers are generally melt processible and/or solution processible.

However, conducting polymers such as polypyrrole, polyaniline, or polythiophene are not very soluble in a solvent, and decompose before melting. Thus it has not been easy to observe the liquid crystalline property from these polymers both in solution and in the fusion state.

One method is to synthesize the soluble conducting polymer to introduce alkyl groups or polar functional groups with long chains in the side chain of the conducting polymer.

One representative is poly(3-3'-thienyl propanesulfonic acid), which is soluble in water and shows lyotropic behavior in an aqueous solution (Mol. Cryst. Liq. Cryst., 1988, 160, 121).

But the redox stability of these thiophene polymers is low and synthesis of the substituted thiophene monomer requires many steps.

Among these conducting polymers, polyaniline has been attractive for practical use as an electronic material in a variety of applications such as a sensor, a photoelectric cell, an electrochromic display device, and a plastic storage battery, because polyaniline has a wide range of desirable electrical, electrochemical and optical properties, coupled with excellent environmental stability. Nonetheless, there is a weak point in that doped polyanilines in their conducting form cannot be directly used as an alignment layer due to its intractability.

Recently it was reported that the dissolution and lyotropic processing of polyaniline in its conducting form is made possible by doping polyaniline with camphor sulfonic acid (Polymer, 199, 34, 3139). However, solubility of the camphor sulfonic acid doped polyaniline in m-cresol is quite low, and it is very difficult to prepare a homogeneous lyotropic solution from this method. Another problem is that the preparation of the camphor sulfonic acid doped polyaniline requires extra steps of dedoping and redoping.

Therefore, the present invention has attempted to answer the above mentioned problems using the soluble conducting polymer obtained in the previous invention (Korean Patent Application No. 92-23786). Previously, we reported that this conducting polymer showed excellent redox stability and outstanding electrochemical and electrochromic stability. Thus, at this time we investigated the processability and liquid crystalline phase behavior of this polymer. It was found that the alkylsulfonate group attached to the side chain of the conducting polymer functions as a self-dopant of the oxidized polymer and as a rigidifying spacer of the polymer to form liquid crystals. The present invention was thus completed from the above finding.

In other words, the purpose of the present invention is to introduce the formation of a conducting polymer liquid crystal composite and its method of synthesis. This conducting polymer can be synthesized by using chemical and electrochemical techniques reported in the patent application and are providing with liquid crystal properties by being dissolved in a polar solvent and its mixture. Another purpose is to provide conducting polymer alignment layers and their method of preparation. These alignment layers do not produce a static charge during the fabrication of liquid crystal cells since the conductivity of the polymer film is as high as $10^{-3}$ s/cm.

SUMMARY OF THE INVENTION

The present invention is directed to the synthesis of a conducting polymer composite with excellent processability and to the preparation of liquid crystal alignment layers that reduce static charges at the time of manufacturing the liquid crystal display device. Thus, a conducting polymer composite having excellent processability, redox stability, and liquid crystalline properties in a solution state is prepared by using self-doped polyanilines described in structural formula (I).

The conducting polymers of formula (I) are synthesized through a chemical or electrochemical doping method in order that the y value becomes 0.3–1 in formula (I). This compound is dissolved in a polar solvent and is prepared as a lyotropic solution with a polymer weight percentage of 40–90%.

The conducting liquid crystalline composite synthesized in this way may be coated onto a transparent conducting glass or any electrodes used in a display device as a thin film. The liquid crystal composite is oriented in one direction as the viscous lyotropic solution is sheared with the blade of a knife or a glass plate. If this polymer coated glass is dried in air or under reduced pressure at room temperature or at temperatures below 150° C., the conductive alignment layer that retains the orientation of the conducting polymer would be prepared by the evaporation of the solvent.

The conducting liquid crystalline polymer alignment layer synthesized according to the present invention could be effectively applied, without using a rubbing technique, not only to the conventional liquid crystals that are oriented using an insulating alignment layer such as polyimide or LB membrane but also to the orientation of the Ferroelectric liquid crystals, twisted nematic, or guest-host liquid crystals that require an alignment layer with a strong orientation power. Besides, this conductive alignment membrane made of a liquid crystalline polymer can be also applied to other displays and sensors.

DESCRIPTION OF THE DRAWINGS

The present invention will become more fully understood from the detailed description given hereinbelow and the accompanying drawings which are given by way of illustration only, and thus, are not limitative of the present invention, and wherein.

Figure 1:
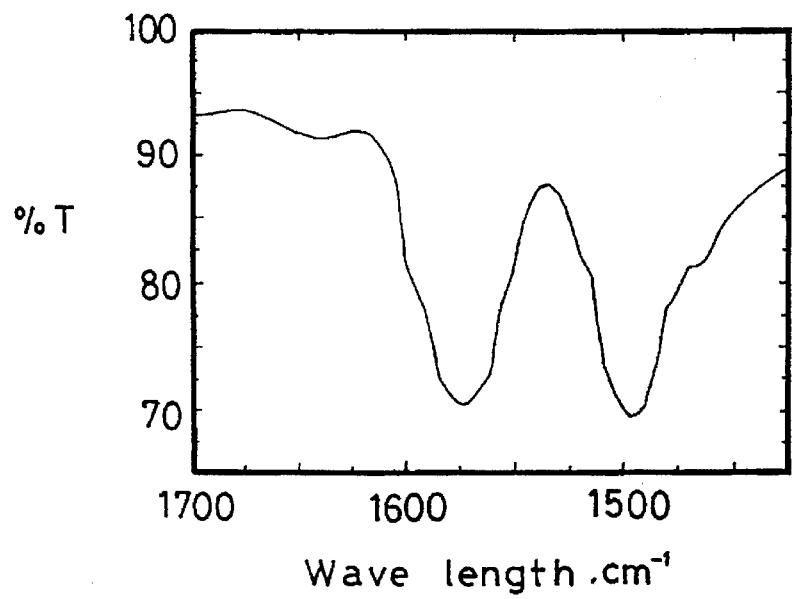
FIG. 1 shows (a) an infrared absorption spectrum and (b) an x-ray photoelectron spectrum of a self-doped liquid crystalline polymer synthesized according to the examples of the present invention.
Figure 1:
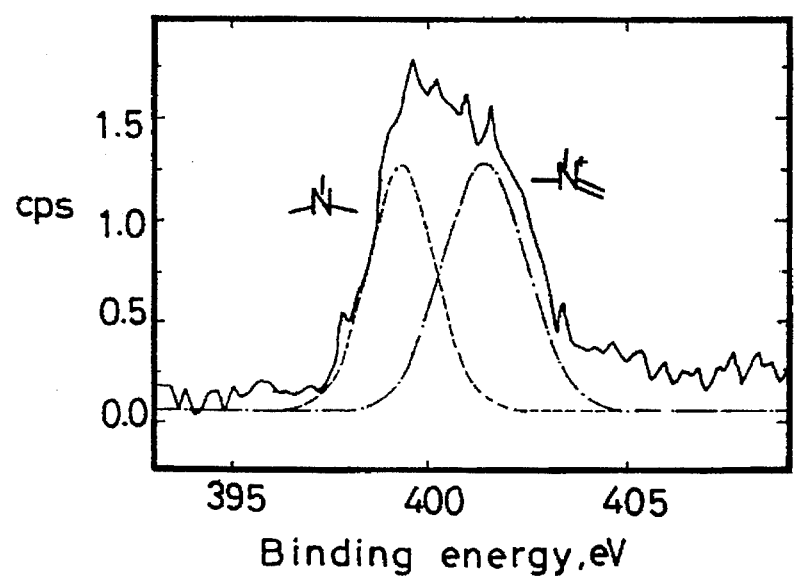
Figure 2A:
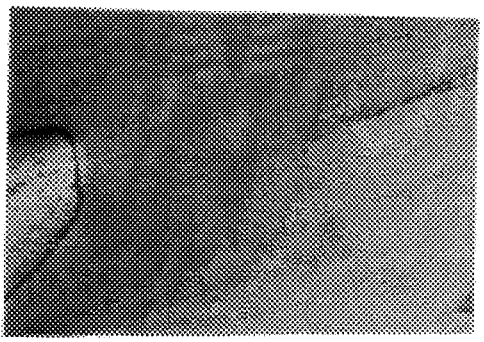
FIG. 2 shows polarized microphotographs of the optical texture observed from the conducting liquid crystalline polymer composites synthesized in the present invention. The polarized microphotographs were taken for: (a) a lyotropic solution right after shearing (b) after ½ hour of elapsed time, (c) after one hour of elapsed time, and (d) sheared again after one hour of elapsed time.
Figure 2B:
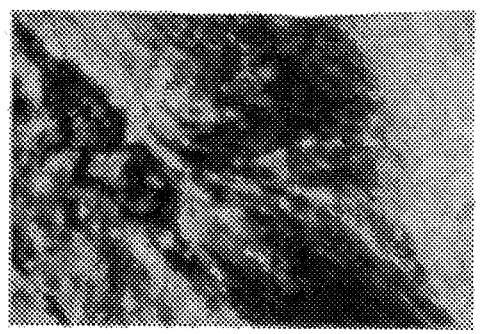
Figure 2C:
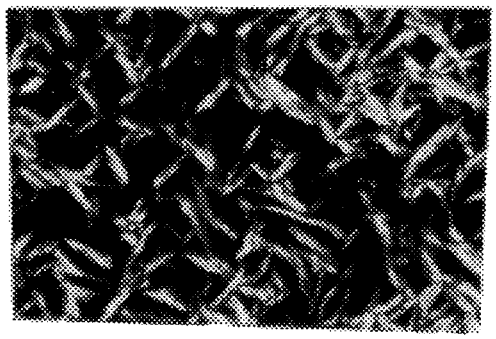
Figure 2D:
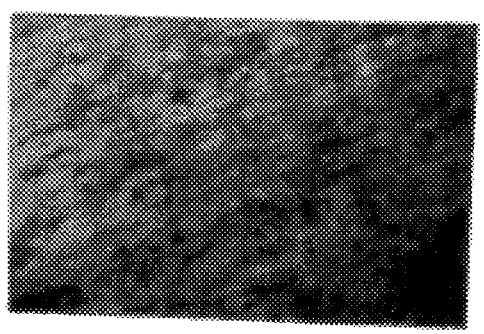

The file of this patent contains at least one drawing executed in color. Copies of this patent with color drawings will be provided by the Patent and Trademark Office upon request and payment of the necessary fees.

DETAILED DESCRIPTION OF THE INVENTION

The process of the present invention will be understood from the following description and examples. The present invention is directed to the formation of conducting liquid crystalline polymer composites with liquid crystalline properties and preparation techniques. The preparation of a liquid crystal alignment layer for liquid crystal displays and its preparation method are also described. More specifically, the present invention relates to the synthesis of conducting liquid crystalline polymer composites which have an excellent self-orientation property in the solution. The preparation method of liquid crystal alignment layers that reduce static charges at the time of manufacturing liquid crystal displays is also of concern. The conducting polymer in the present invention is a self-doped polyaniline derivatives and is illustrated in structural formula (I).

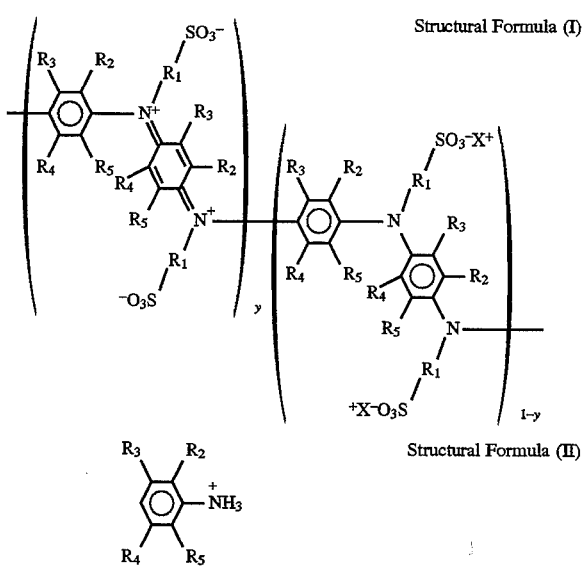

Structural Formula (I)

Structural Formula (II)

In structural formula (I), $R_1$ represents —$(CH_2)_n$—, where n is an integer between 2 and 12. $R_2$, $R_3$, $R_4$, and $R_5$ is hydrogen or one or two of them can be substituted with a halogen atom (fluoride, chloride, bromide and iodide), or a methyl, methoxy, and nitro group. X is hydrogen, or an alkali metal ion such as sodium, lithium, potassium or an alkyl ammonium ion such as tetramethyl ammonium, tetraethyl ammonium, and tetrabutyl ammonium and ammonium ions of aniline derivatives as seen in formula (II). The y value indicates the extent of doping of polyaniline and is between 0.3 and 1. In this formula, a y value of 0 means that the polyaniline system is completely reduced.

With a y value of 0.5, the conductivity of the polymer is at its highest and the polymer is in a half-oxidized state. The alkylsulfonate side group of the polymer act as self dopants to the quinoid groups in the polymer chain as a result of counter ion balancing.

This self-doped polymer can be produced by oxidizing the polymer chemically or electrochemically.

FIG. 1a shows the infrared absorption spectrum of a self-doped poly (aniline N-butylsulfonate). The peaks at 1480 and 1590 cm$^{-1}$ correspond to the C=C vibrational frequency of benzenoid and the quinoid ring, respectively. The area ratio of those two peak is 1:1, indicating that the y value of the polymer is about 0.5. The x-ray photoelectron spectrum of the nitrogen atom for poly(aniline N-butylsulfonic acid) sodium salt is shown in FIG. 1b. The binding energies of 399 and 401 eV are those of the nitrogen atom bound to the benzenoid and quinoid ring, respectively. The area ratio of those two nitrogen centers in the nitrogen atom core-level spectrum is about 1:1 by the spectral deconvolution method indicating the y value of the polymer is about 0.5 and the polymer is self-doped.

In the present invention, the conducting liquid crystalline polymer composite was prepared by the dissolution of the conducting polymer described in formula (I) into a polar solvent.

The synthesis of the conducting liquid crystalline polymer composite is as follows. To obtain a lyotropic solution, the conducting polymer obtained from a known method should be oxidized using a chemical or electrochemical method until the y value in formula (I) becomes 0.3–1. This polymer should then be dissolved into a polar solution such as water, dimethylsulfoxide, dimethylacetamide, N-methylpyrrolidone, methyl alcohol, and ethyl alcohol to prepare a 40–90% solution. At this time, the diluted solutions with 1–40% concentration can be used to remove insoluble impurity. After filtering, the solution can be concentrated to prepare the 40–90% solution. This concentrated solution can be also be used as a substitute.

Even in this case the, concentration is critical for observing the liquid crystalline property of the polymer and the processing should be performed in a concentration range of 40–90%. When the concentration is less than 40%, the lyotropic property of the polymer is not observed. On the other hand, if the concentration is higher than 90%, the processing of the polymer solution becomes very difficult due to a high viscosity of the polymer composite. Additionally, various additives or fillers such as antioxidants, ultraviolet stabilizers, diluents, dyes or pigments, lubricants, thixotropes, thickeners, plasticizers, thinners, can be added by a publicly-known method in order to improve thermal resistance, mechanical property and processibility of the composite.

The conducting liquid crystalline composite synthesized in the present invention may be processed as a thin film on a transparent conducting glass or as electrodes used in display device using a well-known method. For example, after the above liquid crystalline composite is coated as thin film on the transparent conducting glass using a spin-coating or printing technique, a blade edge or glass plate are used to shear the surface of the viscous conductive film. When this sheared polymer composite is dried in air or under reduced pressure at room temperature or at a temperature below 150° C., the conductive film that is ordered by the sheared direction of the polymer composite can be prepared.

However, if the film was dried under reduced pressure at temperature above 150° C., the conductivity of the thin film is decreased due to the thermal decomposition of the polymer. It is possible to examine the optical anisotropy of the above mentioned conducting polymer liquid crystalline composite by using a polarized microscope or X-ray diffractometer.

FIG. 2 shows polarized photomicrographs of 50% polyanfline N-butylsulfonate in water at room temperature.

When the polymer solution was sheared in one direction by sliding with a cover slip, the homogeneously oriented polymer composite transmit polarized light. The optical texture characteristic of the ordered polymer structure appears with shear flow within one hour. This texture becomes coarser on standing at room temperature and changes into a focal-conic texture (FIG. 2(c)) and the equilibrated texture returned to its initial sheared phase when the viscous mixture was sheared again. Such a reversible phase behavior proved that the polymer composite is lyotropic.

When the above viscous polymer composite was sheared in one direction using a blade edge of a knife or a glass plate, the polymer composite was arranged according to that direction. This method can be applied to induce liquid crystals to retain a uniform alignment in a variety of applications.

Therefore, a conductive alignment layer can be synthesized by shearing a lyotropic polymer composite coated on an ITO glass using the blade of a knife or a glass plate, followed by drying of the polymer-coated ITO glass in air or under reduced pressure. The synthesized alignment layer was stable and the ordered direction of the polymer film was not damaged up to 200° C. In addition the coated film did not detached at 200° C.

Figure 3A:
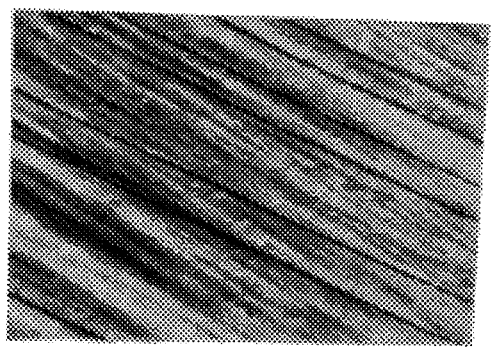
FIG. 3 demonstrates the thermal stability of a conductive alignment layer prepared by the present invention. The polarized microphotographs were taken for an oriented film on an ITO glass: (a) at room temperature, and (b) at 200° C.
Figure 3B:
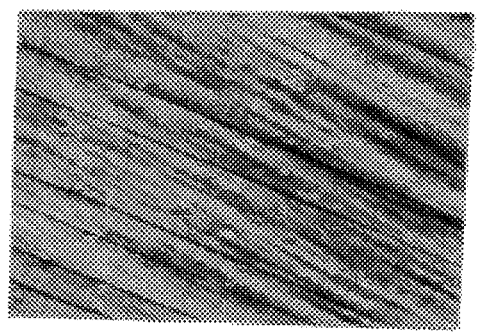

FIG. 3. demonstrates the thermal stability of the conductive alignment layer prepared according to the present invention. The polarized microphotographs of the alignment layer showed that the order of the polymer is retained despite a of thermal treatment even at 200° C. It is possible that the conducting polymer liquid crystalline composite prepared according to the present invention can be processed both in the solution state and in the film state after drying. This composite can be also used for other display devices and electro-optic devices that utilize a liquid crystalline conducting polymer. For instance, the conductive alignment layer synthesized in the present invention can be effectively applied, without using a rubbing technique, to liquid crystals that is oriented by an alignment layer made of an insulating polymer such as a polyimide or a polyimide LB membrane and also is applied to orientation of ferroelectric, twisted nematic, or guest-host liquid crystals that use specific alignment layers requiring a high degree of spatial uniformity. Liquid crystals as mentioned above can be aligned by using two alignment layers prepared by the present invention. In other words, liquid crystals placed in between two crossed alignment layers are aligned and ordered according to the ordered polymer film of the alignment layers.

Figure 4:
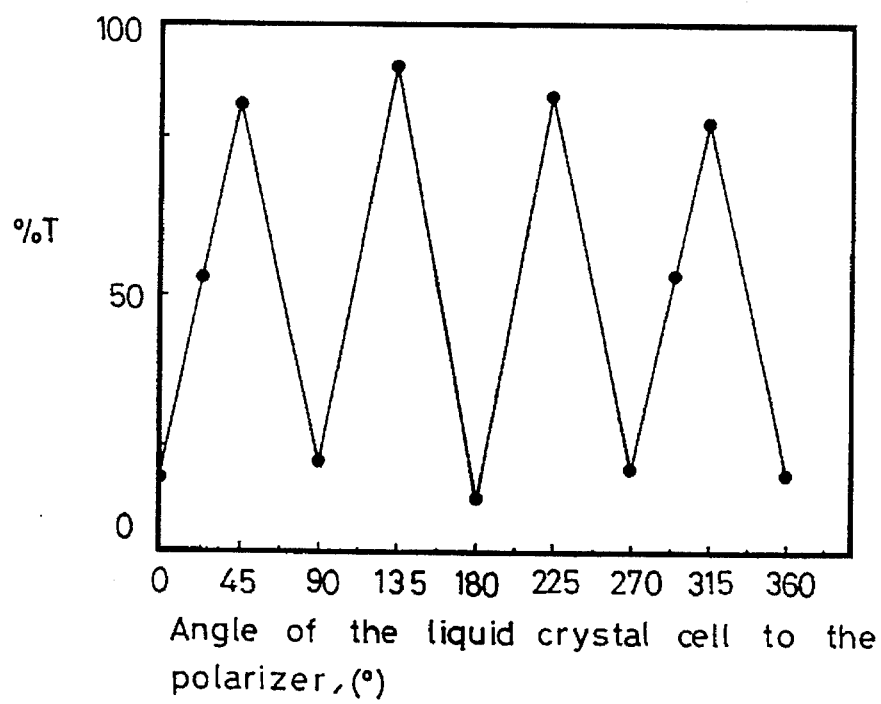
FIG. 4 displays the optical transmittance of a liquid crystal display cell manufactured using the conductive alignment layer of the present invention.

FIG. 4 displays the optical transmittance of a liquid crystal cell as a function of the angle to the polarizer. Here, the above liquid crystal cell contained the LICRILITE BL 001 liquid crystal (Germany. Merck Ltd.) which was oriented by the conducting polymer alignment layers prepared the present invention. When the angle of the liquid crystal cell to the polarizer is 0°, 90°, 180°, 270°, and 360°, the optical transmmitance of the cell is minimum.

The angles of 22.5°, 67.5°, 112.5°, 202.5°, 247.5°, and 337.5° exhibit a medium optical transmittance. Meanwhile, maximum optical transmittance is obtained at the angles of 45°, 135°, 225°, and 315°. The same color contrast is periodically observed at every 45° rotation. This result implies that the LICRILITE BL 01 liquid crystal is effectively oriented between the conducting polymer alignment layer.

Figure 5:
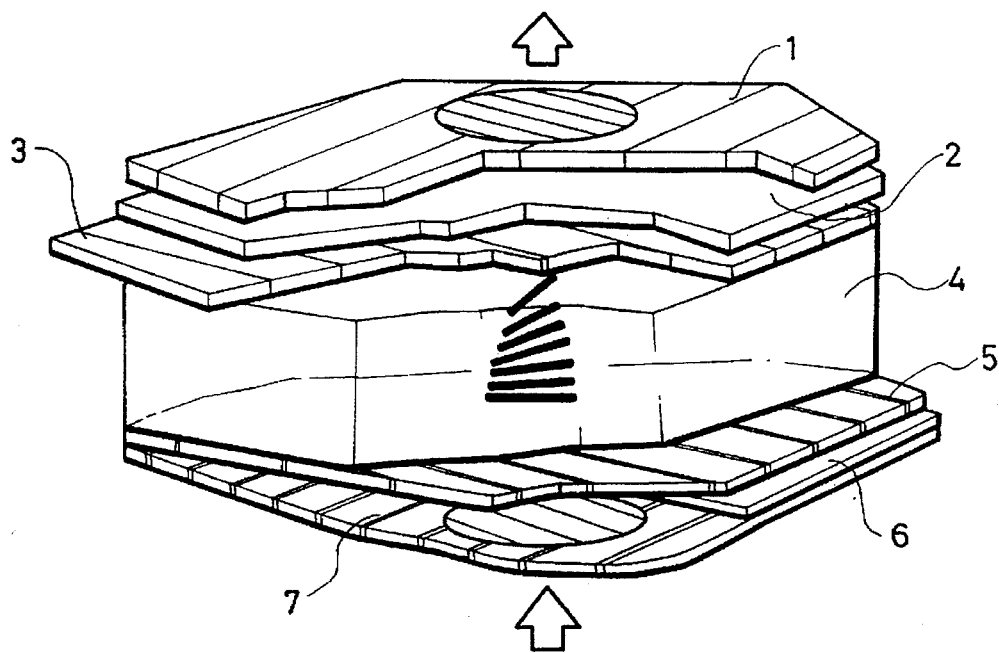
FIG. 5 shows the schematic presentation of a liquid crystal display device manufactured using the conducting polymer alignment layer prepared in the present invention. The detailed description of the main parts in FIG. 5 is as follows: (1) a polarizer (2) a transparent conductingglass, (3) a conductive alignment layer made of a self-doped polyaniline (4) liquid crystals, (5) a conductive alignment layer made of a self-doped polyaniline, (6) a transparent conducting glass (ITO), and (7) a polarizer.

FIG. 5 shows a schematic diagram of a liquid crystal display manufactured using the conducting polymer alignment layer.

Specific illustrations of the present invention may be found in the following examples.

It should be understood, however, that the invention is not limited to the specific details set forth in the examples.

EXAMPLE 1

Synthesis of electrochemically doped conducting polymers.

There are two ways to prepare a polymer coated working electrode for electrochemical doping. One method is that the polymer paste (70 wt %) is prepared by dissolving chemically synthesized poly(aniline N-butylsulfonate) in water. The working electrode is then obtained by coating the polymer paste on a Pt electrode (Pt plate with length 2 cm, width 5 cm). The other method is by electrochemical deposition onto a Pt electrode with poly(aniline N-butylsulfonate) formed during the electrochemical polymerization of aniline N-butylsulfonate using a potentiostat or a galvanostat. The synthesized working electrode was put into a conventional 3-electrode electrochemical cell which contains a 10% perchloric acid solution and 90% acetonitrile solution of 0.1M sodium perchlorate. The counter electrode and reference electrode were Pt and Ag/AgCl, respectively. When the polymer coated working electrode was charged with a constant voltage of 0.5 V, the polymer film on the working electrode was self-doped electrochemically. After about 30 min of electrochemical doping, the polymer film coated on the working electrode was, then, washed with acetonitrile and peeled off from the electrode after drying in a vacuum.

The polymer obtained using this method exhibited a conductivity of $6 \times 10^{-5}$ s/cm.

The structure that contains about 50% quinoid in the structural formula (I) was confirmed from the infrared absorption spectrum and X-ray photoelectron spectrum as shown in FIG. 1.

EXAMPLE 2

Synthesis of the chemically doped conducting polymers.

Poly(aniline N-butylsulfonate) (1 g) that was polymerized through a known electrochemical or chemical technique was dissolved into 10% hydrochloric acid aqueous solution and then chilled with ice bath. At this time, the temperature should be retained below 0. To this solution was slowly added 1 g of ammonium persulfate or sodium persulfate dissolved in water and the mixture was stirred for 1 h. After 6 h of stirring, the contaminants with low molecular weights of less than 3500 were removed using a dialysis technique in a hydrochloric acid aqueous solution. The self-doped polymer with a conductivity of $5 \times 10^{-5}$ s/cm was obtained by removing water and drying in a vacuum.

EXAMPLE 3

Preparation of the conducting liquid crystalline polymer composites.

A 50% polymer mixture was prepared by dissolving poly(aniline N-butylsulfonate) synthesized by Example 1 in the water. The mixture was homogenized by using a sonicator and maintained at room temperature for 2 days. 0.2 mL of this solution was dropped onto a conducting glass and the glass plate was then covered by a cover glass. When viewed using a polarized microscope, the texture due to the optical anisotropy was observed as shown in FIG. 2.

When the polymer liquid crystalline solution was slowly dried in air, the liquid crystalline phase was retained, as confirmed by the polarized microscope. The X-ray diffractogram indicated that the liquid crystalline polymer film prepared using this method was highly ordered.

EXAMPLE 4

Preparation of a conductive alignment layer.

The above conducting polymer liquid crystalline composite (50 wt %) was coated on a transparent conducting glass (ITO glass) using a spin-coating technique. Subsequently, the coated thin film was sheared into one direction with a blade edge. From the polarized microscope it was observed that the polymer composite was homogeneously arranged according to the sheared direction. When this oriented conducting polymer paste was dried at room temperature for 10 h, the conductive alignment membrane in which the polymer composite holds the liquid crystalline ordering was produced. At this time, the thickness of oriented polymer film was 5 µm and the surface conductivity of the alignment layer was 3.6 s/cm.

While the alignment layer was slowly heated from 25° to 200° C., the ordered direction of the polymer film was maintained and the polymer film was not abraded.

EXAMPLE 5

Synthesis of the conducting liquid crystal alignment layer.

The 20% aqueous solution of the conducting polymer in Example 2 was spin-coated on an ITO glass. Subsequently the solvent was dried slowly at room temperature. When the concentration of polymer was 50%, the coated thin film was sheared with a blade edge. This method can also produce an aligned polymer film as in Example 4. After the oriented conducting polymer paste was dried at room temperature for 10 h, the thickness of oriented polymer film and the surface conductivity of the film were 3 μm and $8.7 \times 10^{-1}$ s/cm, respectively.

EXAMPLE 6

Orientation of liquid crystals using the conducting liquid crystal alignment layers.

The LICRILITE BL 001 liquid crystal (Germany, Merck Ltd.) was coated with a few μm thick on the conductive alignment layer synthesized in Examples 4 or 5.

Subsequently, this conductive alignment layer was perpendicularly covered by another conductive alignment layer synthesized in Examples 4 or 5. The degree of alignment of liquid crystals was determined using a polarized microscope. The cell was sealed by using an epoxy glue.

When the angle of the above liquid crystal cell was 0°, 90°, 180°, 270°, 360° to the polarizer, the optical transmittance was minimum. The angles of 22.5°, 67.5°, 112.5°, 157.5°, 202.5°, 247.5°, 292.5°, 337.5° to a polarizer exhibited medium optical transmittance and the color of the transmitted light through the cell was light green. Meanwhile, the maximum optical transmittance was observed at angles of 45°, 135°, 225°, and 315°. At the time of every 45° rotation, the same color contrast was periodically observed. This observation confirms that LICRILITE BL 001 liquid crystals were effectively aligned by two conducting polymer alignment layers.

FIG. 4 shows the optical transmittance as a function of the angle between the above liquid crystal cell to a polarizer. The liquid crystal cell which is composed of two conductive polymer alignment layer and the liquid crystals prepared in the invention can be used for the schematic diagram of liquid crystal displays as can be seen in FIG. 5.

In FIG. 5, 1 and 7 are the polarizer perpendicular to each other, 2 and 6 are the transparent conducting glasses, 3 and 5 the conducting polymer alignment layer prepared on the transparent conducting glasses (2 and 6), where these alignment layers cross each other, and finally, 4 is LICRILITE BL 001 liquid crystals that is used for liquid crystal display devices and can be substitute to other liquid crystals such as ferroelectric liquid crystals (FLC), super twisted nematic liquid crystals (STN), and twisted nematic (TN) liquid crystals.

Therefore, in the present invention, the conducting polymer liquid crystalline composite that can effectively orient the liquid crystalline materials can be synthesized, and from this, alignment layers of liquid crystal displays may be also prepared.

In particular, the invention provides synthetic techniques of the conducting polymer liquid crystalline composites and alignment layers for liquid crystal displays. The conductive polymer alignment layer can increase the production yield of liquid crystal cells and improve the performance of the liquid crystal cells by virtue of the conductivity of the alignment layers which reduce applied voltage, static charges, and dust contamination. In addition, with the improved processability of polymer composites, it is easier to fabricate a liquid crystal cell and to control alignment of liquid crystals through a self-ordered polymer film.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A conductive polymer liquid crystalline solution comprising a lyotropic solution which is prepared by dissolving a self-doped poly(aniline N-alkylsulfonate) as shown in the following structural formula (I) in a polar solvent and in a concentration of 40–90 wt %,

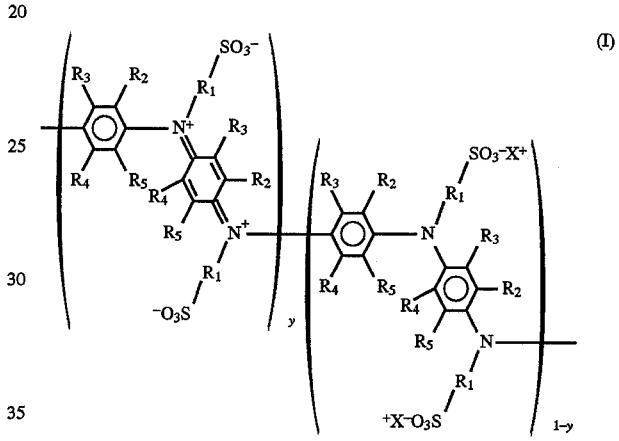

wherein the y value indicates the extent of doping of the conductive polymer and is between 0.3 and 1; $R_1$ is $-(CH_2)_n$; n is an integer between 2 and 12; and $R_2$, $R_3$, $R_4$ and $R_5$ are hydrogen, halogen, methyl, methoxy or nitro groups, respectively, provided that at least two of them are hydrogen; X is hydrogen, an alkali metal ion, an alkyl ammonium ion or an ammonium ion of an aniline derivative as shown in the following structural formula (II):

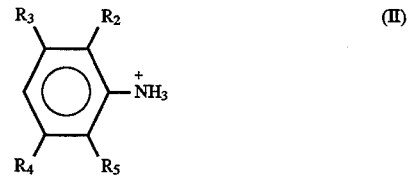

2. The conductive polymer liquid crystalline solution according to claim 1 wherein said polar solvent is selected from the group consisting of water, dimethylsulfoxide, dimethylacetamide, N-methylpyrrolidone, methyl alcohol and ethyl alcohol.

3. A method for the preparation of a conductive polymer liquid crystalline solution, comprising the steps of:

dissolving a self-doped poly(aniline N-alkylsulfonate) as shown in the following formula (I) in a polar solvent to give a 1–40 wt % solution,

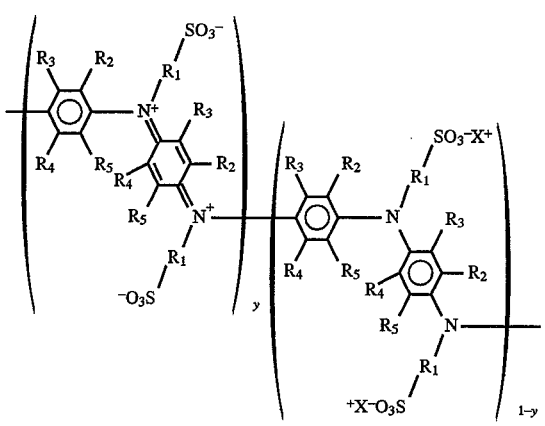

wherein, the y value indicates the extent of doping of the conductive polymer and is between 0.3 and 1; $R_1$ is $-(CH_2)_n-$; wherein n is an integer between 2 and 12; and $R_2$, $R_3$, $R_4$ and $R_5$ are hydrogen, halogen, methyl, methoxy or nitro groups, respectively, provided that at least two of them are hydrogen; X is hydrogen, an alkali metal ion, an alkyl ammonium ion or an ammonium ion of an aniline derivative as shown in the following structural formula (II),

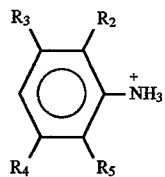

filtering off the impurities from the 1–40 wt % solution, and concentrating the filtrate to give a lyotropic solution with a concentration of 40–90 wt %.

4. The method for the preparation of a conductive polymer liquid crystalline solution according to claim 3 wherein said polar solvent is selected from the group consisting of water, dimethylsulfoxide, dimethylacetamide, N-methylpyrrolidone, methyl alcohol and ethyl alcohol.

5. A method for the preparation of a conductive liquid crystal alignment layer, comprising the steps of:

dissolving a self-doped poly(aniline N-alkylsulfonate) as shown in the following formula (I) in a polar solvent with a concentration of 1–40 wt %,

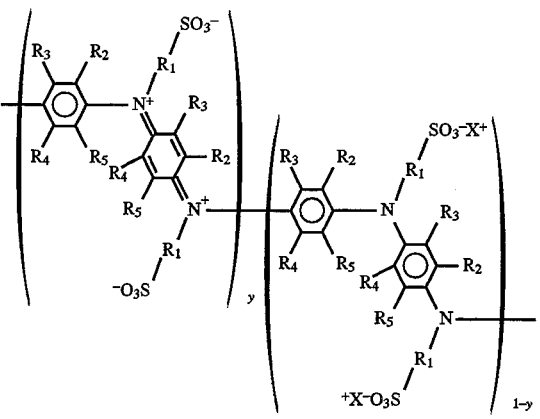

wherein the y value indicates the extent of doping of the conductive polymer and is between 0.3 and 1; $R_1$ is $-(CH_2)_n$, wherein n is an integer between 2 and 12; and $R_2$, $R_3$, $R_4$ and $R_5$ are hydrogen, halogen, methyl, methoxy or nitro groups, respectively, provided that at least two of them are hydrogen; X is hydrogen, an alkali metal ion, an alkyl ammonium ion or an ammonium ion of an aniline derivative as shown in the following structural formula (II),

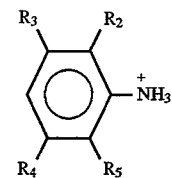

filtering off the impurities from the 1–40 wt % solution, concentrating the filtrate to give a lyotropic solution with a concentration of 40–90 wt %, applying the lyotropic solution to an electrode used in a liquid crystal display device, aligning the applied solution, and evaporating the solvent from the aligned solution in air or reduced pressure at a temperature of from room temperature to 150° C.

6. The method for the preparation of a conductive liquid crystal alignment layer according to claim 5 wherein said electrode is a transparent conductive glass electrode.

7. The method for the preparation of a conductive liquid crystal alignment layer according to claim 5 wherein said polar solvent is selected from the group consisting of water, dimethylsulfoxide, dimethylacetamide, N-methylpyrrolidone, methyl alcohol and ethyl alcohol.

8. The conductive liquid crystal alignment layer prepared by the method of claim 5.

9. A liquid crystal display using the conductive liquid crystal alignment layer of claim 8.

10. A method for the preparation of a conductive liquid crystal alignment layer, comprising the steps of:

dissolving a self-doped poly(aniline N-alkylsulfonate as shown in the following formula (I) in a polar solvent with a concentration of 1–40 wt %,

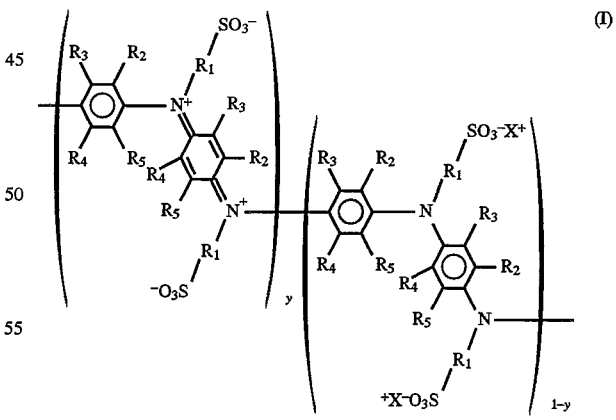

wherein the y value indicates the extent of doping of the conductive polymer and is between 0.3 and 1; $R_1$ is $-(CH_2)_n$, wherein n is an integer between 2 and 12; and $R_2$, $R_3$, $R_4$ and $R_5$ are hydrogen, halogen, methyl, methoxy or nitro groups, respectively, provided that at least two of them are hydrogen; X is hydrogen, an alkali metal ion, an alkyl ammonium ion or an ammonium ion of an aniline derivative as shown in the following structural formula (II),

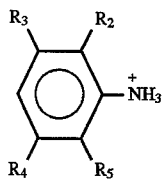

filtering off the impurities from the 1–40 wt % solution, applying the filtrate to an electrode used in a liquid crystal display device, concentrating the applied filtrate to give a lyotropic solution with a concentration of 40–90 wt %, aligning the lyotropic solution, and evaporating the solvent from the aligned solution in air or reduced pressure at a temperature of from room temperature to 150° C.

11. The method for the preparation of a conductive liquid crystal alignment layer according to claim 10 wherein said electrode is a transparent conductive glass electrode.

12. The method for the preparation of a conductive liquid crystal alignment layer according to claim 10 wherein said polar solvent is selected from the group consisting of water, dimethylsulfoxide, dimethylacetamide, N-methylpyrrolidone, methyl alcohol and ethyl alcohol.

13. The conductive liquid crystal alignment layer prepared by the method of claim 10.

14. A liquid crystal display using the conductive liquid crystal alignment layer of claim 13.

* * * * *